(12) United States Patent
Glazkov (10) Patent No.: US 9,342,323 B2
(45) Date of Patent: May 17, 2016

(54) BROWSER-LEVEL BACKGROUND PAGE FOR PROVIDING MULTIPLE VIEWS

(75) Inventor: Dimitri Glazkov, Mountain View, CA (US)

(73) Assignee: Google Inc., Mountain View, CA (US)

( * ) Notice: Subject to any disclaimer, the term of this patent is extended or adjusted under 35 U.S.C. 154(b) by 741 days.

(21) Appl. No.: 13/570,962

(22) Filed: Aug. 9, 2012

(65) Prior Publication Data

US 2014/0047318 A1 Feb. 13, 2014

(51) Int. Cl.
*G06F 9/00* (2006.01)
*G06F 9/44* (2006.01)

(52) U.S. Cl.
CPC ................................. *G06F 9/4443* (2013.01)

(58) Field of Classification Search
CPC .................................................... G06F 9/4443
See application file for complete search history.

(56) References Cited

U.S. PATENT DOCUMENTS

| | | | | |
|---|---|---|---|---|
| 2005/0267725 A1* | 12/2005 | Reeder et al. | ................... | 703/22 |
| 2007/0094604 A1* | 4/2007 | Sahoo | ........................... | 715/746 |
| 2007/0260749 A1* | 11/2007 | Lahdensivu | ................. | 709/246 |
| 2007/0266050 A1* | 11/2007 | Kaandorp | ..................... | 707/200 |
| 2008/0155457 A1* | 6/2008 | Ittel | ............................... | 715/781 |
| 2008/0172624 A1 | 7/2008 | Matsutsuka et al. | | |
| 2009/0158243 A1* | 6/2009 | Bolarinwa | .................... | 717/105 |
| 2009/0300060 A1* | 12/2009 | Beringer et al. | ........... | 707/103 R |
| 2009/0328072 A1* | 12/2009 | Shin et al. | ..................... | 719/318 |
| 2010/0138778 A1* | 6/2010 | Dewan et al. | ................ | 715/789 |
| 2010/0180205 A1* | 7/2010 | Deshpande et al. | .......... | 715/744 |
| 2012/0066620 A1* | 3/2012 | Teng et al. | ..................... | 715/762 |
| 2013/0167110 A1* | 6/2013 | Gross et al. | ................... | 717/105 |

FOREIGN PATENT DOCUMENTS

WO 2014/025467 A1 2/2014

OTHER PUBLICATIONS

International Preliminary Report on Patentability for PCT Patent Application No. PCT/US2013/047551, mailed on Feb. 19, 2015, 10 pages.
Glazkov, "What the Heck is Shadow DOM", WebKit, glazkov.com/2011/01/14/what-the-heck-is-shadow-dom/, Jan. 14, 2011, 12 pages.
"XBL 2.0", W3C, Working Draft, dev.w3.org/2006/xbl2/, May 2, 2012, 44 pages.
"Shadow DOM", W3C, Editor's Draft, dvcs.w3.hg/webcomponents/raw-file/tip/spec/shadow/index.html, May 3, 2012, 19 pages.
"Model-view-controller", from Wikipedia, the free encyclopedia, May 3, 2012, 2 pages.

(Continued)

*Primary Examiner* — Stephen Hong
*Assistant Examiner* — Marshon Robinson
(74) *Attorney, Agent, or Firm* — Brake Hughes Bellermann LLP (57) ABSTRACT

A method for implementing web applications includes projecting, using a processor of a computing device, one element of a web page of a web application into a view of the web page, the view being a visual representation of a model of the web page, the model including application data and rules. A controller mediates input and converts input to commands for the view or the model. The controller transposes the one element projected in the view of the web page and another element using an insertion point that represents a defined location in a shadow document object model subtree, without affecting a document object model tree of the web page.

12 Claims, 10 Drawing Sheets

(56) References Cited

OTHER PUBLICATIONS

Search Report and Written Opinion for International Application No. PCT/US2013/047551, mailed Nov. 20, 2013, 12 pages.

Michaux, "MVC Architecture for 1-20 JavaScript Applications", retrieved on Oct. 22, 2013 from http://michaux.ca/articles;mvc-archite cture-for-javascript-applications, Feb. 24, 2011, 12 pages.

* cited by examiner

```html
<!DOCTYPE html>
<html>
<head>
   <title> Views Demo</title>
   <link rel="stylesheet" type="text/css" href="views.css">
   <script src="views.js"></script>
</head>
<body>
<h1> Views Demo</h1>
<!-- The "window" attribute picks the window (dialog, main window, etc?) in which to show the view -->
   <view id="main-view" window="main">
      <!-- scenes can be nested inside the view ... -->
      <scene id="first-screen">
         <h1>This is first screen</h1>
         <p>Hello and welcome!</p>
         <a href="#second-screen">Go to second screen</a>
      </scene>
   </view>
   <scene id="second-screen" view="main-view">
      <!-- or they can just reference a view -->
      <h1>This is second screen</h1>
      <p>Goodbye</p>
      <a href="#first-screen">Go back to first screen</a>
   </scene>
</body>
</html>
```

FIG. 5A

```
(function() {
  window.View = function() {
    var root = new WebKitShadowRoot(this);
    this._content = root.appendChild(document.createElement('content'));
    this._content.select = 'scene:first-of-type';   }
  window.View.prototype = Object.create(WebKitShadowRoot.prototype, {
    setScene: { value: function(scene)
      { if (scene.id) this._content.select = 'scene#' + scene.id;  }  });
  function asArray(value) {return [].slice.call(value);}
  function morph(element, func) {
    element.__proto__ = func.prototype;
    func.call(element);
    return element; }
  window.Scene = function() {
    var view = document.getElementById(this.getAttribute('view'));
    if (!view) {
      if (this.parentElement.tagName == 'VIEW')
        view = this.parentElement;
    } else {        view.appendChild(this);       }
    this.view = view;   }
  window.Scene.prototype = Object.create(HTMLUnknownElement.prototype);
  function Controller() {
    document.addEventListener('DOMContentLoaded', this._initialize.bind(this));
    document.addEventListener('click', this._onClick.bind(this));   }
  Controller.prototype = { _initialize: function()
    {Array(document.querySelectorAll('view')).forEach(function(view) {
         morph(view, window.View); });
  asArray(document.querySelectorAll('scene')).forEach(function(scene) {morph(scene, window.Scene); });     },
    _onClick: function(evt)
    {if (evt.target.tagName != 'A')
        return;
      evt.preventDefault();
      this.route(evt.target.getAttribute('href'));     },
    route: function(url)
    {if (url.indexOf('#') != 0)
        return;
      var scene = document.getElementById(url.substring(1));
      if (!scene)
        return;
      var view = scene.view;
      if (!view)
        return;
      view.setScene(scene);     } }
  window.controller = new Controller();})();
```

FIG. 5B

```
body {
    position: absolute;
    width: 0px;
    height: 100%;
    overflow: hidden;
    margin: 0;
    left: -1000px;
} view {
    position: absolute;
    top: 0;
    left: 1000px;
    width: 800px;
    height: 600px;
}
```

BROWSER-LEVEL BACKGROUND PAGE FOR PROVIDING MULTIPLE VIEWS

TECHNICAL FIELD

This description generally relates to a model-view-controller framework.

BACKGROUND

Generally, web applications today attempt to follow a model-view-controller (MVC) design pattern for user interfaces. The MVC design pattern divides an application into three areas of responsibility: (a) the Model: the domain objects or data structures that represent the application's state; (b) the View, which observes the state and generates output to the users; and (c) the Controller, which translates user input into operations on the model. One problem that web applications commonly run into is that a document object model (DOM) tree that represents the web application is uniform and does not provide any encapsulation abstractions. This leads to a struggle to maintain logical separation of primitive data types (such as Model and View).

One workaround to the MVC design pattern has been providing alternative means of operation by the user interface developer. This workaround, however, resulted in a vast set of user interface-specific APIs. Accordingly, there exists a need for systems and methods to address the shortfalls of present technology and to provide other new and innovative features.

SUMMARY

According to one general aspect, a method for implementing web applications may include projecting, using a processor of a computing device, one element of a web page of a web application into a view of the web page, the view being a visual representation of a model of the web page, the model including application data and rules. A controller may mediate input and converts input to commands for the view or the model. The controller may transpose the one element projected in the view of the web page and another element using an insertion point that represents a defined location in a shadow document object model subtree, without affecting a document object model tree of the web page.

According to another general aspect, a system may include a memory and a processor operably coupled to the memory and configured to execute code to provide an HTML document including a list of models, wherein each model in the list is a child of a body of the HTML document, create a shadow document object model subtree in the body of the HTML document, the shadow document object model subtree including one or more insertion points, and specify which model in the list of models to display in a view of a web page, using matching criteria of the one or more insertion points.

According to yet another general aspect, a non-transitory computer readable medium may contain executable code that causes a computing device to project, using a processor of the computing device, one element of a web page into a view of the web page, and transpose, using the processor, the one element projected in the view of the web page and another element using an insertion point that represents a defined location in a shadow document object model subtree, without notifying a browser-level background page. The browser-level background page may be a script file that lacks a user interface of its own and acts as a container for all views of a web application, including the view of the web page. Every window created by the web application may show a different view of the browser-level background page.

The details of one or more implementations are set forth in the accompanying drawings and the description below. Other features will be apparent from the description and drawings, and from the claims.

BRIEF DESCRIPTION OF THE DRAWINGS

FIGS. 5A, 5B, and 5C include examples of code for the web application of FIGS. 4A and 4B.

Like reference symbols in the various drawings indicate like elements.

DETAILED DESCRIPTION

A document object model (DOM) is a cross-platform and language-independent convention for representing and interacting with objects in HTML, XHTML, and XML documents. As used herein, a "document" refers to the DOM's underlying document. A "node" refers to any DOM object that participates in a tree. A DOM "tree" refers to any tree composed of DOM objects. Objects in a DOM tree may be addressed and manipulated by using methods on the objects. A "DOM structure" refers to a DOM tree or fragment of a DOM tree.

Web applications may follow a model-view-controller (MVC) design pattern for user interfaces that divides an application into three areas of responsibility: (a) the Model: the domain objects or data structures that represent the application's state; (b) the View, which observes the state and generates output to the users; and (c) the Controller, which translates user input into operations on the model. One issue the web applications commonly run into is that the DOM tree that represents the web application is uniform and does not provide any encapsulation abstractions. This leads to a struggle to maintain logical separation of primitive data types (such as Model and View).

Using implementations of a "shadow DOM" (such as insertion points and their matching criteria, described in more detail with respect to FIGS. 1-7), it is possible to provide better separation of concerns between the View and Model primitive data types. With shadow DOM, an HTML document consists of a list of Models, and each Model is a child of the document's body. A shadow DOM subtree is created on the body of the document. This subtree represents the View. In this subtree, one or more insertion points are used as openings in the View, through which the Model bits show through, and matching criteria of the insertion points are used by the Controller to specify which Model to show in a View. The matching criteria may be represented by a "select" attribute on a <content> HTML element.

When the Controller (e.g., web application) modifies this attribute value, the matching criteria changes, which in turn triggers a change of what is being rendered in place of this <content> HTML element. A developer of a web application can designate DOM elements in the document as Views and change the matching criteria to match any of these DOM elements to make them appear in place of the <content> HTML element, thereby providing a clean separation between the content of the View and how its selection is controlled. The Model bits are never changed or informed in any way by the Controller (or View), even while the View is changed. Thus, user interfaces of web applications, and components of the user interfaces, may be manipulated, modified, and enhanced, without requiring changes to the basic code of the document markup of the web application Model.

Figure 1:
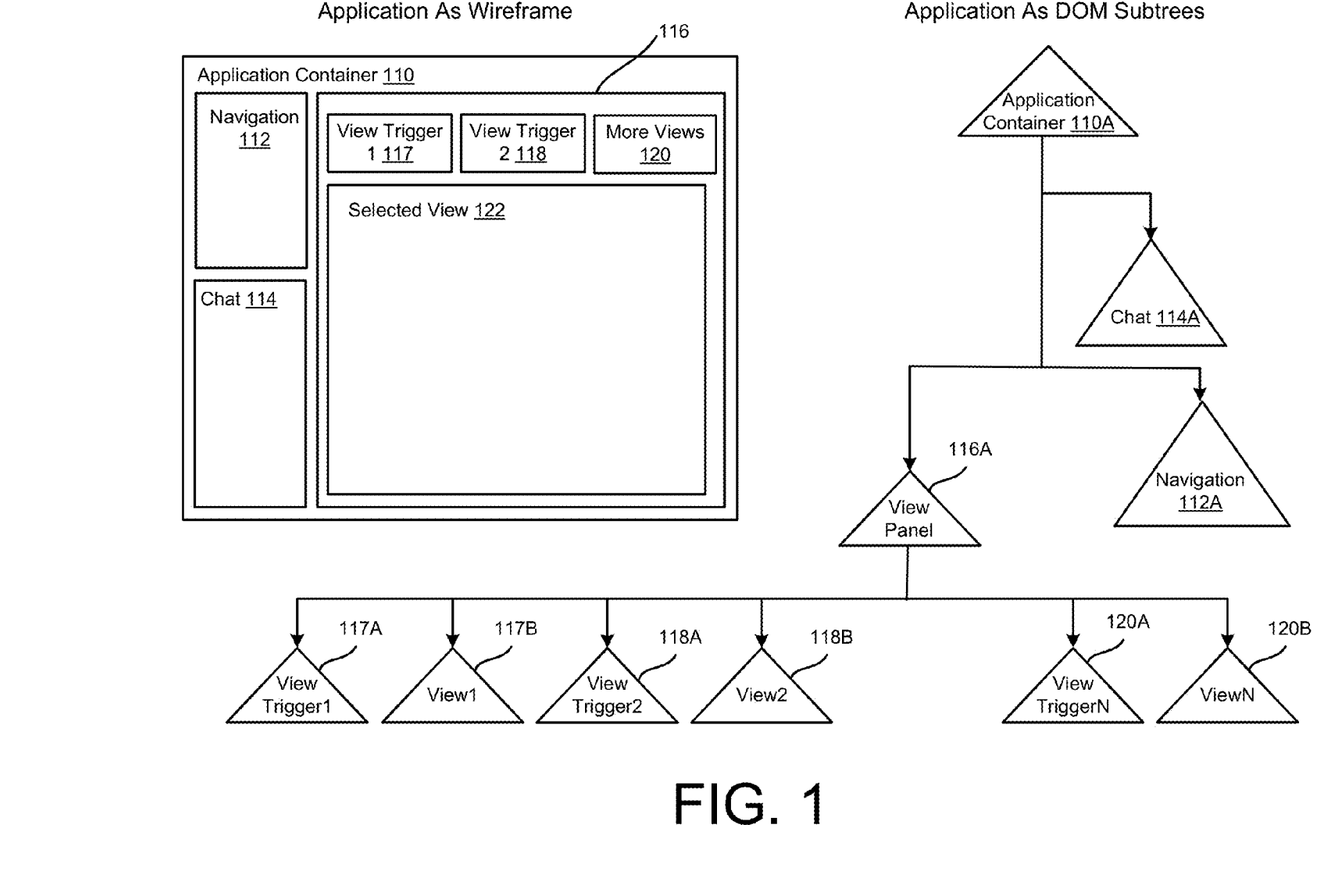
FIG. 1 is an example block diagram of a web application framework.

FIG. 1 is an example block diagram of a web application framework. In this context, a "web application" may be configured to execute a single task or multiple tasks for a user. In such an implementation, the web application may be configured to be executed or interpreted by a web browser. This is compared with the native applications that include machine executable code and are configured to be executed directly by a processor or via the operating system of the client device, whereas, a web application may be incapable of execution or display without the aid of the web browser. Thus, web applications can be run inside a browser with a dedicated user interface, and typically provide functionality and an experience that is more rich and interactive than a standalone website but are less cumbersome and monolithic than a desktop application. Examples of web applications include games, photo editors, and video players that are run inside the browser.

Web application developers often encounter the need to provide encapsulation of a DOM structure. Despite being part of one document tree, there may be many functional fragments of DOM (or DOM subtrees), as well as assumptions about these fragments operating independently. This type of encapsulation is referred to as "functional encapsulation," as opposed to "trust encapsulation," which deals with limiting information flow based on trust and ensuring security of data and state within an application. Functional encapsulation establishes functional boundaries in a document tree. A functional boundary (or "boundary") is a delineation of functional concerns between two loosely coupled units of functionality.

A web application user interface may be composed of several user interface elements (or "widgets"), each representing a DOM subtree. In cases where a widget is tasked with hosting other widgets, the widget may need to understand where its DOM subtree ends and another widget's DOM subtree begins.

This need for observing the functional boundaries in a document tree is even larger when a widget is operated on—added, moved, or removed in the document tree—by an outside actor, such as the web application that consumes these widgets. Unless a widget consumer knows exactly how a widget's DOM structure is designed, it is impossible for the consumer to reasonably operate on the widget.

As shown in the implementation depicted in FIG. 1, an example application container 110 may include a "navigation" widget 112, a "chat" widget 114, a "view trigger 1" widget 116, a "view trigger 2" widget 118, a "more views" widget 120, and a "selected view" widget 122.

When the web application is modeled as DOM subtrees, as shown in FIG. 1, application container node 110A may include, as its child subtree, a node chat 114A, which in turn includes, as its children nodes view panel 116A and navigation 112A. View panel 116A may include as its children a view trigger 1 117A, its view 117B, view trigger 2 118A, its view 118B, and so on, up to any number of view triggers, illustrated by view trigger N 120A, and its viewN, 120B.

Figure 2:
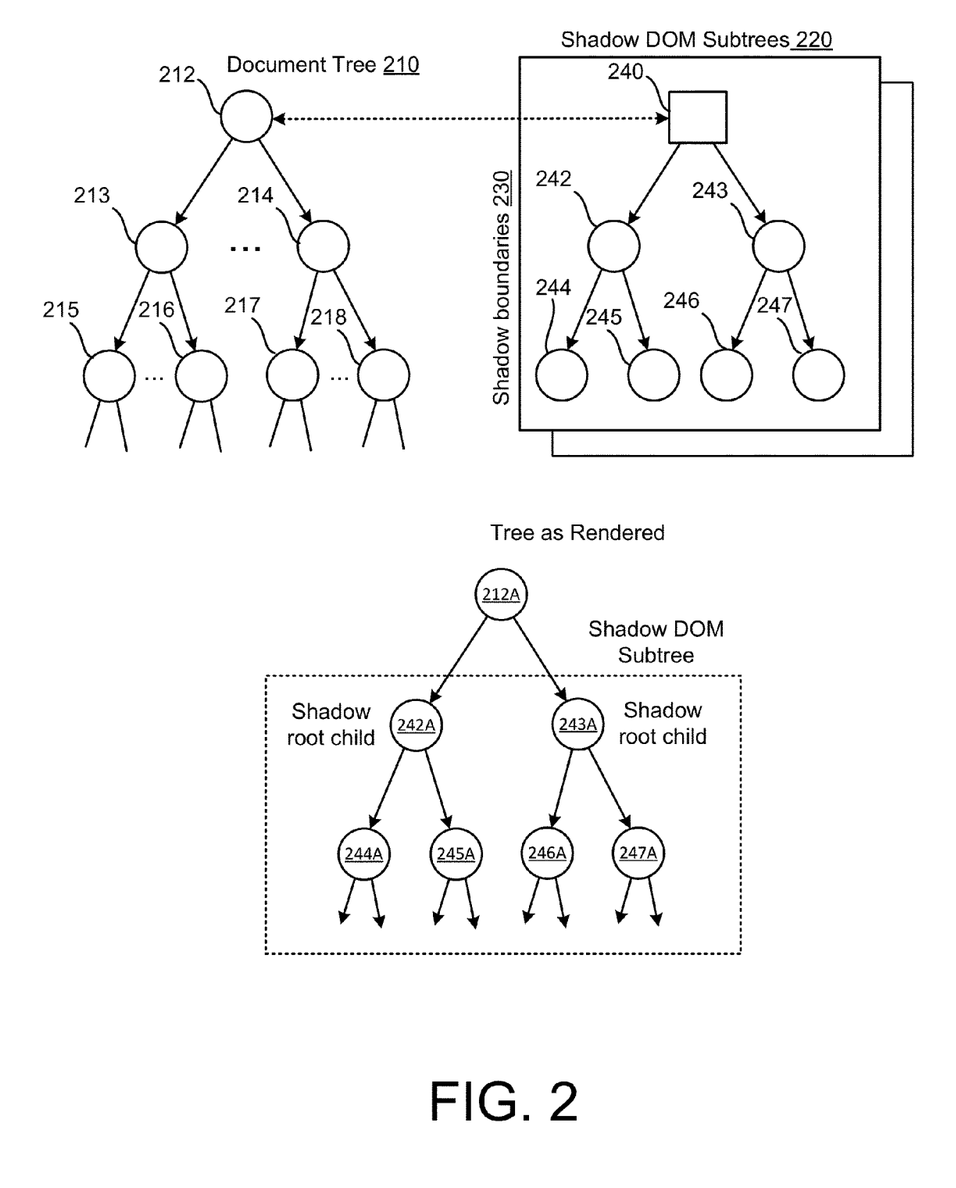
FIG. 2 is an example block diagram of a shadow document object model framework.

FIG. 2 is an example block diagram of a shadow document object model (DOM) framework. As shown in FIG. 2, a document tree 210 may include a shadow host 212, and one or more child nodes 213, 214, 215, 216, 217, and 218, as examples. Document tree 210 could include any number of child nodes. Shadow DOM subtrees 220 may be created, for example by a developer of the web application that developed document tree 210.

A "shadow DOM" structure allows multiple shadow DOM subtrees 220 (in addition to the document tree 210) to be composed into one larger tree when rendered (for example, by a renderer process of a browser, as described in more detail below). The existence of multiple shadow DOM subtrees 220 is enabled by letting any element in the document tree 210 host one or more additional DOM subtrees (such as shadow DOM subtrees 220). These shadow DOM subtrees 220 may be governed by a set of rules that establish encapsulation boundaries while retaining standard DOM composability semantics.

The encapsulation boundaries between shadow DOM subtrees 220 are referred to as shadow boundaries 230. The elements that host shadow DOM subtrees are called shadow hosts 212, and the root nodes of the shadow DOM subtrees are called shadow roots 240. The shadow roots 240 may have one or more child nodes, such as nodes 242, 243, 244, 245, 246, and 247, for example.

A web browser that implements the web applications described in FIGS. 1 and 2 may, in some implementations, operate in a multi-process architecture, such that a single browser process manages all tabs, windows, and "chrome" of the web browser (e.g., user interface such as search bar, icons, area outside of a web page of the web browser). The browser process may create many separate renderer processes (also called "renderers"), which may each be responsible for rendering web pages. The renderer processes may contain all the complex logic for handling HTML, JavaScript, CSS, images, and so on. Each renderer process is run in a sandbox, which means it has almost no direct access to a computing device's disk, network, or display. All interactions with web applications, including user input events and screen painting, may go through the browser process. This lets the browser process monitor the renderers for suspicious activity, killing them if it suspects an exploit has occurred. The browser process may also create one separate process for each type of plug-in that is in use, such as FLASH. These processes may only contain the plug-ins themselves, along with some code to let them interact with the browser and renderers. Once a web browser has created its browser process, it may, in some implementations, also create one renderer process for each instance of a web site a user visits. This approach aims to keep pages from different web sites isolated from each other. Other types of browsers with renderers may operate using a single process architecture.

When rendered, for example by a renderer of a web browser, the shadow DOM subtree 220 may take the place of the shadow host's 212 content. Thus, when rendered, shadow host 212 content (represented by node 212A shown in FIG. 2) includes children 242A, 243A, 244A, 245A, 246A, and 247A, which represent the shadow DOM subtree 220 content. Thus, when rendered, the document tree 210 may include the content form one or more shadow DOM subtrees 220, thus allowing a web application to expose parts of a View and switch to expose other parts of a web page. This allows a developer of the web application to avoid re-coding up a whole web application or web page and avoid the complexity of managing the web page using the MVC design pattern.

Figure 3:
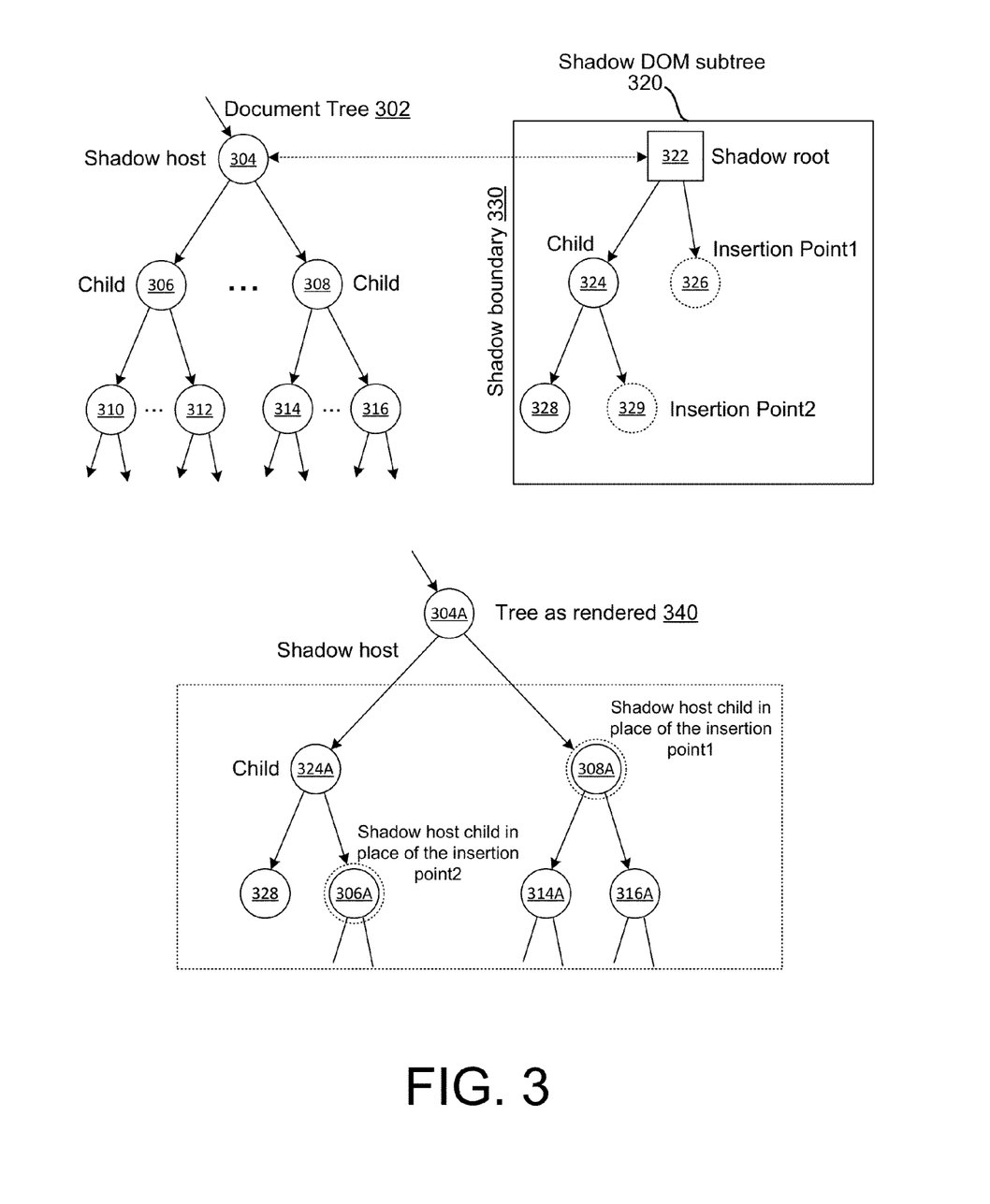
FIG. 3 is an example block diagram of another shadow document object model framework.

FIG. 3 is an example block diagram of another shadow document object model framework. To enable composition of shadow host's children and the shadow DOM subtree, a set of "insertion points" 326 and 329 may be utilized. An "insertion point" refers to a defined location in the shadow DOM subtree 220, to which the shadow host's children are transposed when rendered.

As shown in FIG. 3, a Document Tree 302 may include a shadow host 304, and child nodes 306, 308, 310, 312, 314, and 316. Shadown DOM 220 may include shadow root 322, child 324, and insertion pointl 236. Child 324 may also have child nodes 328 and insertion point2 329. When the tree is rendered 340, the shadow host 304A may include child 306A, which in turn may have child nodes 310A and 312A. Node 312 may be the shadow host child in place of the insertion point2 329. Shadow host 304A may also include a shadow host child 308A in place of insertion pointl 326, which may include as child nodes 314A and 316A. As discussed above, the insertion points 326 and 329 are defined location in the shadow DOM subtree 220, to which the shadow host's children (e.g., 306, 308, etc.) are transposed when rendered.

To maintain the lower-boundary encapsulation, the distribution of child nodes of the shadow host among the insertion points in the associated shadow DOM subtree include various traits. For example, the distribution does not affect the state of the document DOM tree or shadow DOM subtrees. Each insertion point participates in distribution by providing a matching criteria for the child nodes. The matching criteria determines whether a given node could be distributed to a given insertion point. The distribution is a result of executing a stable algorithm. The distribution itself does not change the variables affecting the distribution. The distribution reoccurs whenever any variable affecting it is changed The distribution algorithm may produce an outcome that is equivalent of the outcome of processing these steps: Input: TREE, which is a shadow DOM subtree; POOL, which is a list of DOM nodes. Output: The nodes in POOL are distributed among insertion points in TREE. Repeat for each active insertion point in TREE, in tree order:

Let POINT be the current insertion point
Repeat for each node in POOL:
Let NODE be the current node
If the NODE matches POINT's matching criteria:
Distribute the NODE to POINT
Remove NODE from the POOL
Otherwise, continue to repeat
Continue to repeat
Matching Insertion Points The matching criteria for an insertion point is defined as a set of selector fragments. Each selector fragment is a fragment in the selector (shadow-host)>(fragment), where (shadow-host) is a selector that uniquely identifies the shadow host, and (fragment) is the selector fragment.

Matching Host and Children, Distributed to Insertion Points

Two kinds of selectors, declared in shadow DOM subtrees match elements outside of the tree in which they are declared: (1) A :host pseudoclass, which matches the shadow host of a shadow DOM subtree; and (2) A select reference combinator, which matches the nodes, currently distributed to an insertion point. The :host pseudoclass represents the shadow host of a shadow DOM subtree. If the contextual reference element set is empty or includes elements outside of a shadow DOM subtree, :host matches northing. Reference combinators match the children of a shadow host, distributed to the insertion points within a shadow DOM subtree. To match, all of these conditions apply: The combinator value is select; the first compound selector of the combinator matches an insertion point; and the second compound selector matches an element, distributed to this insertion point.

For example, .some-insertion-point/select/div.special will match all div elements that have class attribute set to special and have been distributed to an insertion point that has a class attribute set to some-insertion-point.

A shadow host may host more than one shadow DOM subtree. In such cases, the subtrees are stacked in the order they were added to the host, starting with the subtree added most recently. This set of trees is called a tree stack. The more recently added subtree is called the younger tree, and the less recently added subtree is called the older tree. The most recently added subtree is called the youngest tree.

To facilitate composing multiple shadow subtrees of the same host, a special kind of insertion point is defined. The shadow insertion point designates a place in the shadow DOM subtree, where an older tree is inserted.

Comparatively, a shadow DOM subtree can be seen as somewhere between just a DOM subtree in a document and a document fragment. Because it is rendered, a shadow DOM subtree aims to retain the traits of a typical DOM subtree in a document. At the same time, it is an encapsulation abstraction, so it has to avoid affecting the document DOM tree. Thus, the HTML elements behave as specified in the shadow DOM subtrees, with a few exceptions.

Shadow DOM Example

As an example, a developer is asked to turn a simple list of links into a News Widget, which has links organized into two categories: breaking news and just news. The current document markup for the stories may look like this:

```
<ul class="stories">
    <li><a href="//example.com/stories/1">A story</a></li>
    <li><a href="//example.com/stories/2">Another story</a></li>
    <li class="breaking"><a href="//example.com/stories/3">Also a story</a></li>
    <li><a href="//example.com/stories/4">Yet another story</a></li>
    <li><a href="//example.com/stories/4">Awesome story</a></li>
    <li class="breaking"><a href="//example.com/stories/5">Horrible story</a></li>
</ul>
```

To organize the stories, the developer decides to use shadow DOM. Doing so will allow Bob to keep the document markup uncluttered, and harnessing the power of insertion point makes sorting stories by class name a very simple task. The developer mocks up the following shadow DOM subtree, to be hosted by the ul element:

```
<div class="breaking">
    <ul>
        <content select=".breaking"></content> <!-- insertion point for breaking news -->
    </ul>
</div>
<div class="other">
    <ul>
        <content></content> <!-- insertion point for the rest of the news -->
    </ul>
</div>
```

The developer then styles the new widget according to comps from the designer by adding this to the shadow DOM subtree mockup:

```
<style scoped>
    div.breaking {
        color: Red;
        font-size: 20px;
        border: 1px dashed Purple;
    }
    div.other {
        padding: 2px 0 0 0;
        border: 1px solid Cyan;
    }
</style>
```

The developer converts the mockup to code:

```
function createStoryGroup(className, content Selector)
{
    var group = document.createElement('div');
    group.className = className;
    // Empty string in select attribute or absence thereof work the same,
    so no need for special handling.
    group.innerHTML = '<ul><content select="' +
    contentSelector + '"></content></ul>';
    return group;
}
function createStyle( )
{
    var style = document.createElement('style');
    style.scoped = true;
    style.textContent = 'div.breaking { color: Red;font-size: 20px; border: 1px dashed Purple; }' +
        'div.other { padding: 2px 0 0 0; border: 1px solid Cyan; }';
    return style;
}
function makeShadowSubtree(storyList)
{
    var root = new ShadowRoot(storyList);
    root.appendChild(createStyle( ));
    root.appendChild(createStoryGroup('breaking', '.breaking'));
    root.appendChild(createStoryGroup('other', ''));
}
document.addEventListener('DOMContentLoaded', function( ) {
    [ ].forEach.call(document.querySelectorAll('ul.stories'),
    makeShadowSubtree);
});
```

Figure 4A:
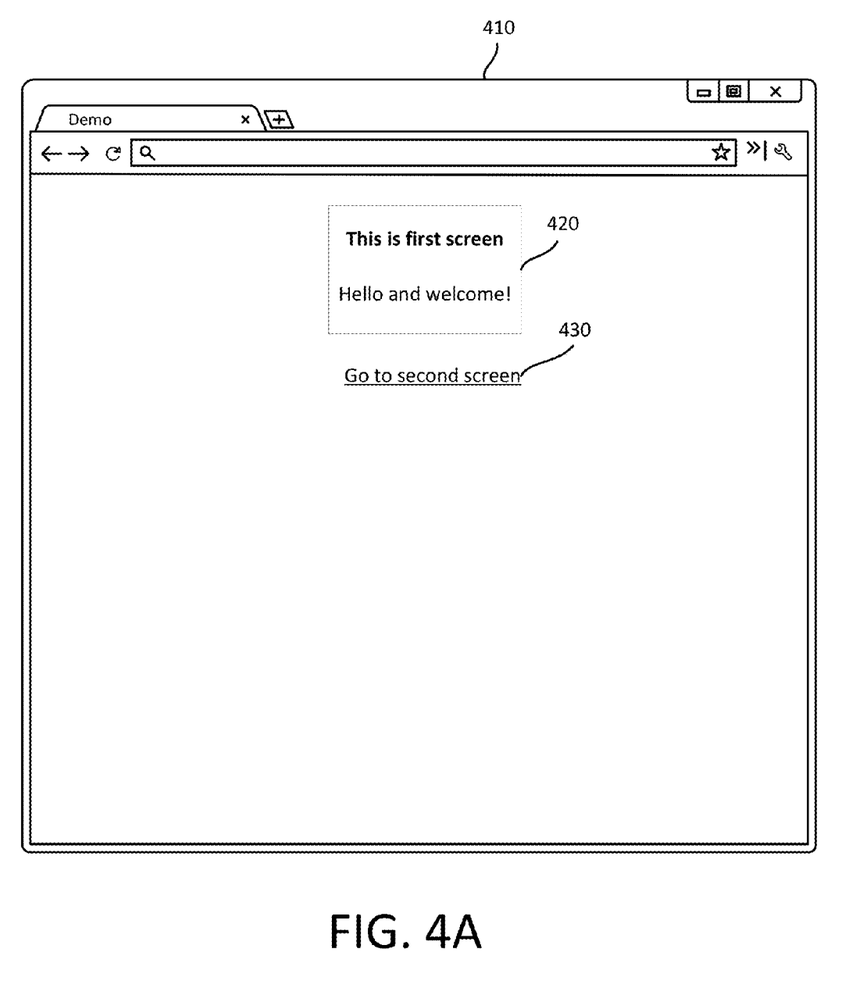
FIG. 4A is an example of a user interface for a web application, in accordance with techniques described here.

FIG. 4A is an example of a user interface for a web application, in accordance with techniques described here. User interface 410 may be a user interface for a portion of a web application (e.g., a web page displayed in a web browser) that utilizes a browser-level background page and shadow DOM architecture, described above with respect to FIGS. 1-3. User interface 410 may include various content elements, such as text element 420, which may include text such as "This is first screen" and "Hello and welcome!". User interface 410 may also include a link element 430, such as "Go to second screen." As described above with respect to FIGS. 1-3, when the controller, in this case a web application, modifies an attribute value for a content element, the matching criteria changes, which in turn triggers a change of what is being rendered in place of the content element (such as elements 420 or 430). A developer of a web application then can designate DOM elements (such as elements 420 and 430) in the document as Views and change the matching criteria to match any of these DOM elements to make them appear in place of the content element(s), for example as described below with respect to FIG. 5.

Figure 4B:
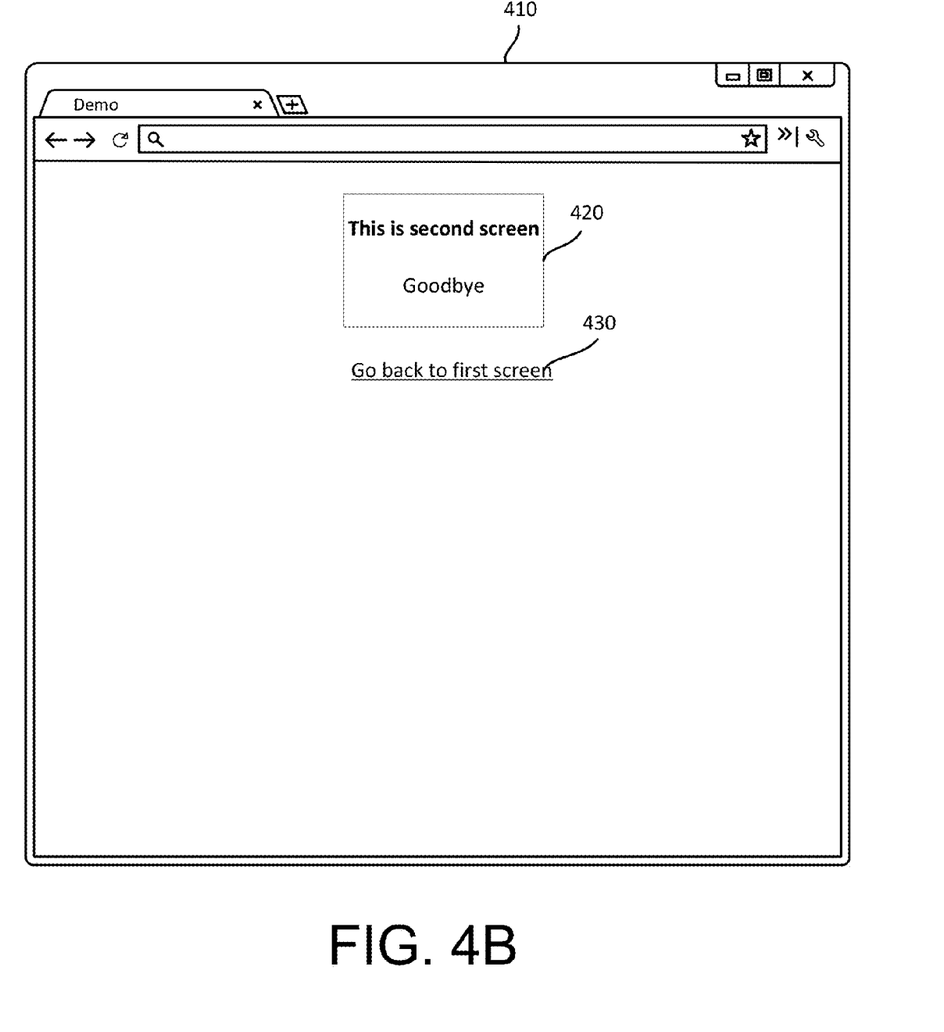
FIG. 4B is an example of another user interface for a web application, in accordance with techniques described here.

FIG. 4B is another example of a user interface for a web application, in accordance with techniques described here. User interface 410 may be programmed using the same DOM for the web application described with respect to FIG. 4A, with modifications to the view of the user interface 410. Such modification to the view may be done without notifying or modifying the browser-level background page associated with the web application, as described above with respect to FIGS. 1-3.

As shown in FIG. 4B, user interface 410 may still include text element 420, which may now show a different set of text from that depicted in FIG. 4A, such as "This is second screen" and "Goodbye". User interface 510 may also include the link element 430, which may now display a different selectable link, i.e., "Go back to first screen." In the example shown in FIG. 4B, a developer of the web application that displays user interface 410 has designated DOM elements 420 and 430 in the document as views and has changed the matching criteria to match the DOM elements, to make the new content (i.e., text and links) appear in place of the content for the same content elements 420 and 430 shown in FIG. 4A.

Figure 5A:
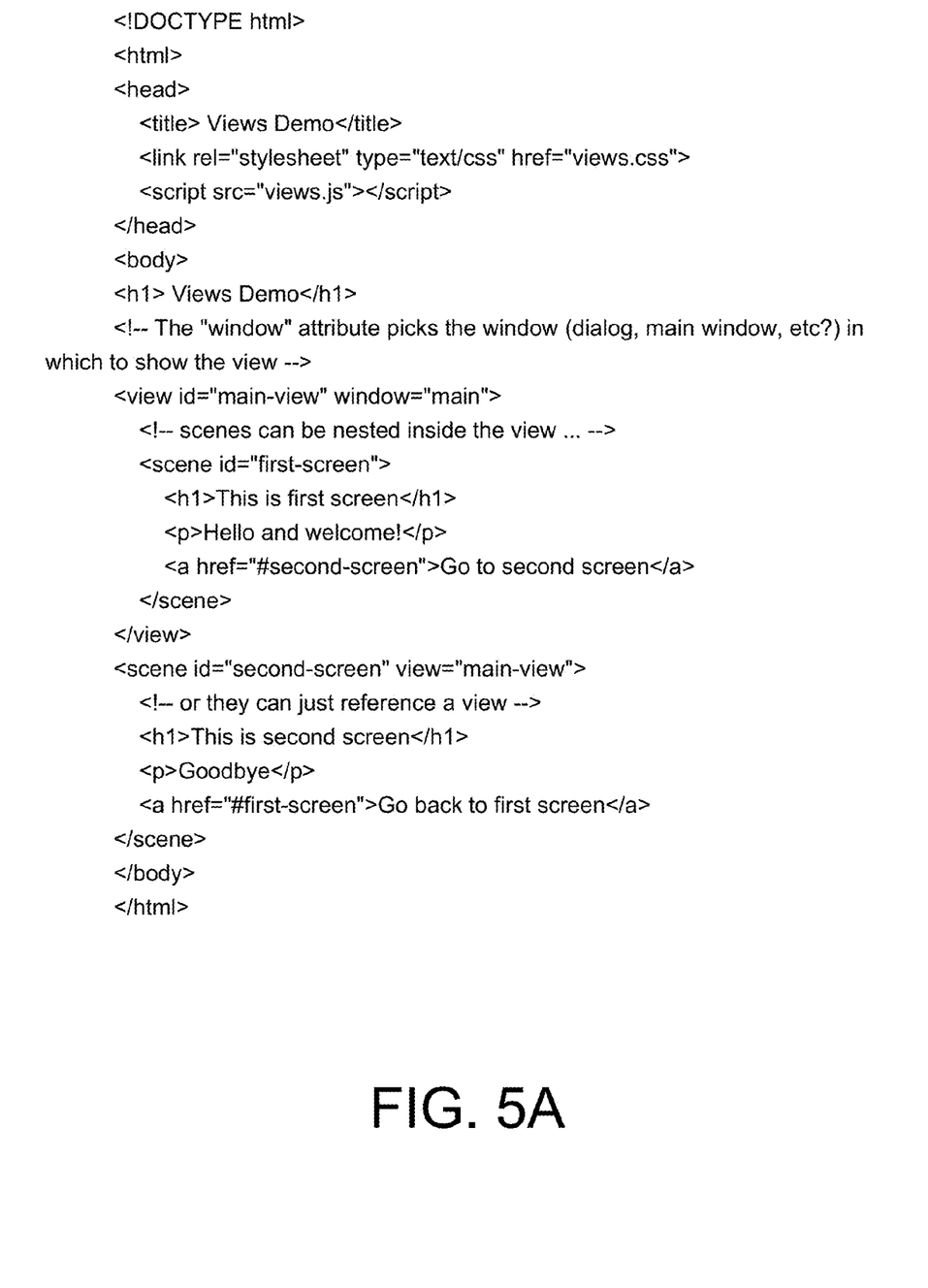
Figure 5C:
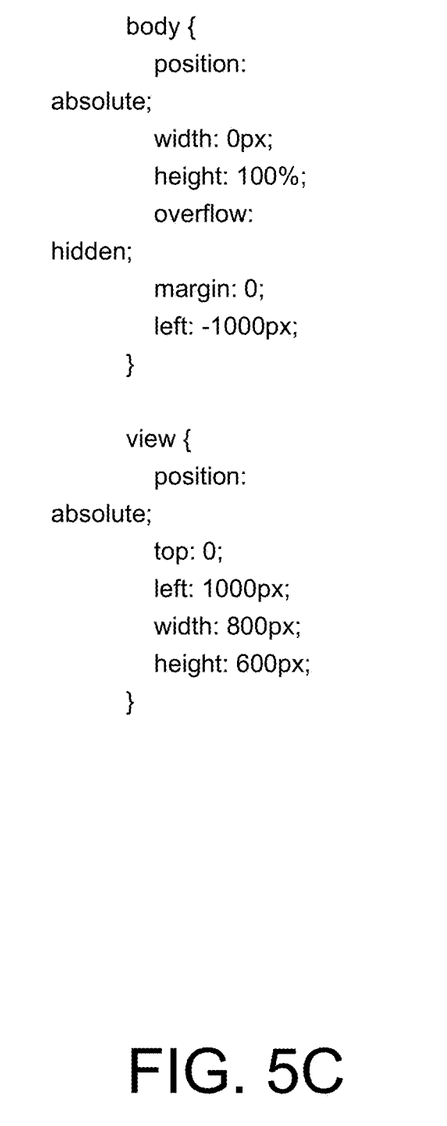

FIGS. 5A, 5B, and 5C include examples of code for the web application of FIGS. 4A and 4B. The code for the example web application discussed with respect to FIGS. 4A and 4B may include an index.HTML file, a views.js JAVASCRIPT file, and a views.css CSS file. The HTML file may contain code such as that shown in FIG. 5A. The views.js file may include code such as that shown in FIG. 5B. The views.css file may contain the code shown in FIG. 5C.

Figure 6:
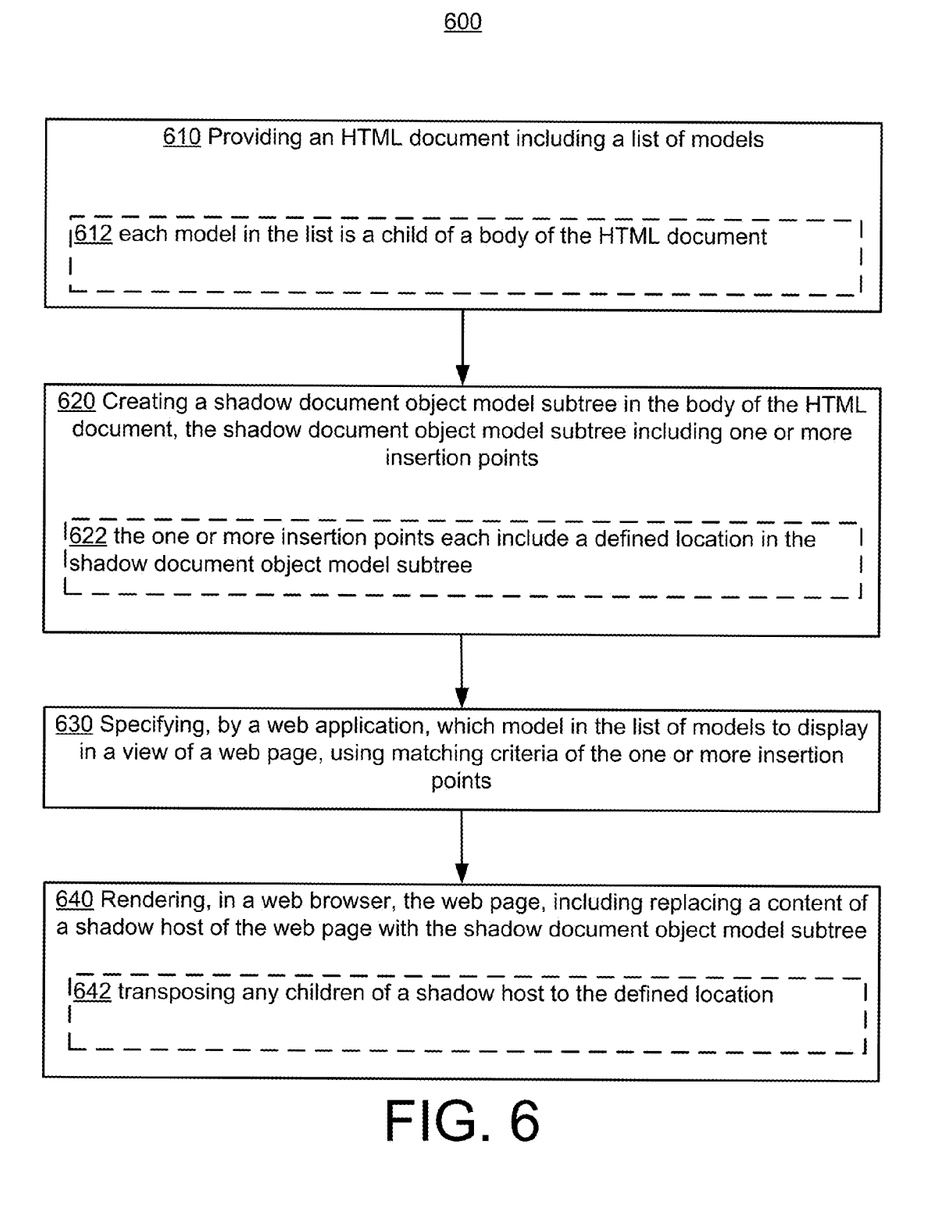
FIG. 6 is a flow diagram illustrating example operations of the system of FIGS. 1-5.

FIG. 6 is a flow diagram illustrating example operations of the system of FIGS. 1-5. The process of FIG. 6 may be performed at least in part by a web application executed by processor of a computing device. Examples of processors and computing devices that may be used to execute web applications are described in more detail below with respect to FIG. 7. As shown in FIG. 6, process 600 includes providing an HTML document including a list of models (610). Each model in the list may be a child of a body of the HTML document (612). The process 600 includes creating a shadow document object model subtree in the body of the HTML document, the shadow DOM including one or more insertion points (620). The one or more insertion points may each include a defined location in the shadow DOM subtree (622). The process 600 may include specifying, by a web application, which model in the list of models to display in a view of a web page, using matching criteria of the one or more insertion points (630). The process 600 may include rendering, in a web browser, the web page, including replace a content of a shadow host of the web page with the shadow document object model subtree (640). In some implementations, the rendering may include transposing any children of a shadow host to the defined location(s) (642).

Figure 7:
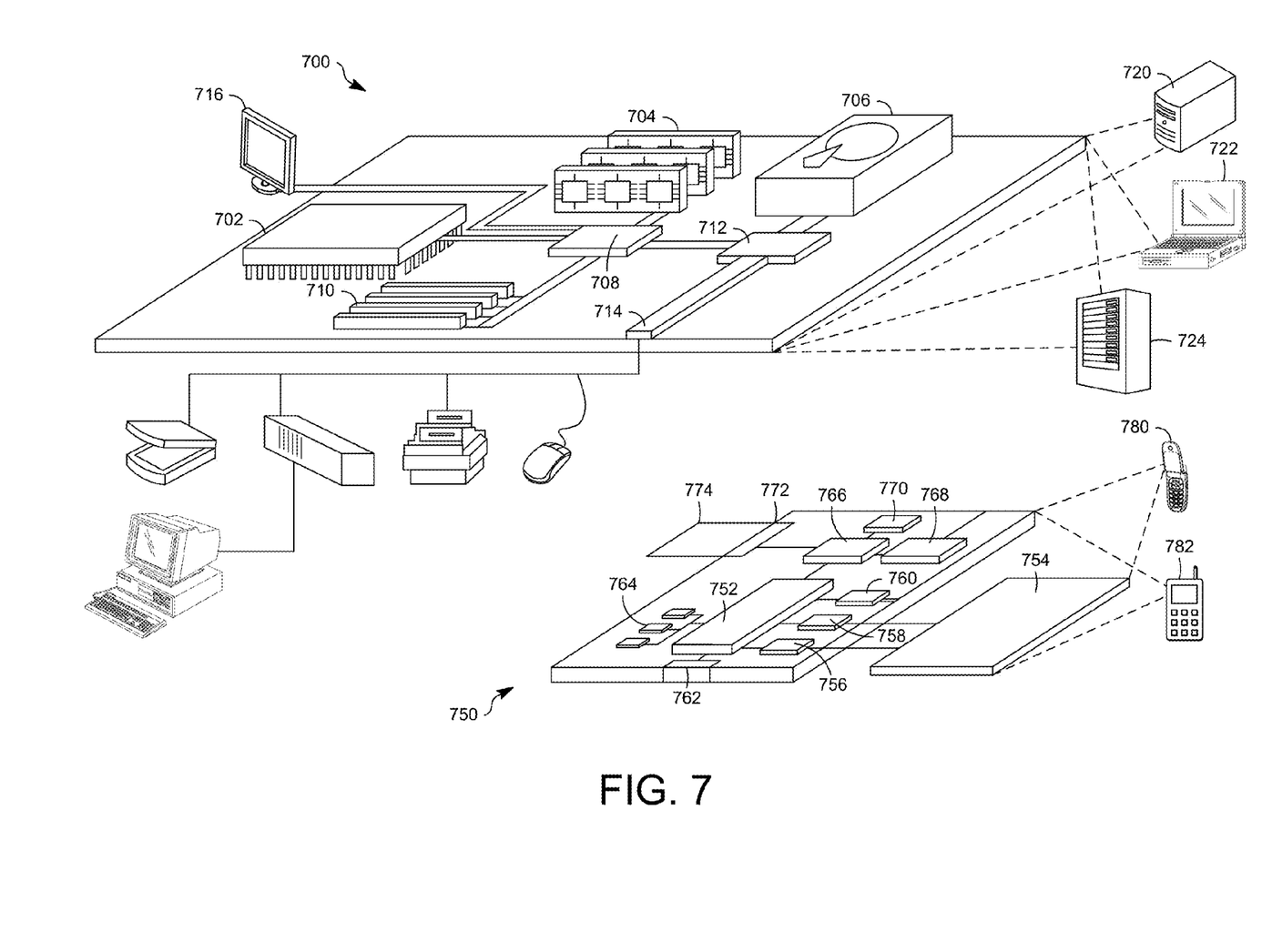
FIG. 7 is a block diagram showing example or representative computing devices and associated elements that may be used to implement systems and methods in accordance with FIGS. 1-6.

FIG. 7 is a block diagram showing example or representative computing devices and associated elements that may be used to implement systems and methods in accordance with FIGS. 1-6. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, which may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a BLUETOOTH, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made to the implementations described herein.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method for implementing web applications, comprising:
    projecting, using a processor of a computing device, one element of a web page of a web application into a view of the web page, the view being a visual representation of a model of the web page, the model including application data and rules, wherein the web application is associated with a browser-level background page that lacks a user interface of its own and that acts as a container for all views of the web application, including the view of the web page, and wherein every window created by the web application shows a different view of the browser-level background page;
    using a controller to mediate input and convert user input to the web application into commands for the view or the model; and
    transposing, by the controller, the one element projected in the view of the web page and another element using an insertion point that represents a defined location in a shadow document object model subtree, without affecting a document object model tree of the web page.

2. The method of claim 1, wherein the browser-level background page is unaffected by any currently displayed view.

3. The method of claim 1, wherein the browser-level background page includes an HTML document.

4. The method of claim 1, wherein the one element and the another element are HTML content elements.

5. The method of claim 1, wherein matching criteria are provided by the insertion point for its child nodes to specify whether a given node could be distributed to a given insertion point.

6. The method of claim 1, wherein the shadow document object model subtree is hosted by an element in the document model tree of the web page.

7. A computing system comprising:
    a memory storing executable instructions; and
    a processor operably coupled to the memory and configured to execute the instructions to:
    project one element of a web page of a web application into a view of the web page, the view being a visual representation of a model of the web page, the model including application data and rules, wherein the web application is associated with a browser-level background page that lacks a user interface of its own and that acts as a container for all views of the web application, including the view of the web page, and wherein every window created by the web application shows a different view of the browser-level background page;

use a controller to mediate input and convert user input to the web application into commands for the view or the model; and transpose, by the controller, the one element projected in the view of the web page and another element using an insertion point that represents a defined location in a shadow document object model subtree, without affecting a document object model tree of the web page.

8. The computing system of 7, wherein the browser-level background page is unaffected by any currently displayed view.

9. The computing system of 7, wherein the browser-level background page includes an HTML document.

10. The computing system of 7, wherein the one element and the another element are HTML content elements.

11. The computing system of 7, wherein matching criteria are provided by the insertion point for its child nodes to specify whether a given node could be distributed to a given insertion point.

12. The computing system of 7, wherein the shadow document object model subtree is hosted by an element in the document model tree of the web page.

* * * * *